US010400675B2

(12) United States Patent
Sennoun et al.

(10) Patent No.: US 10,400,675 B2
(45) Date of Patent: Sep. 3, 2019

(54) CLOSED LOOP COOLING METHOD AND SYSTEM WITH HEAT PIPES FOR A GAS TURBINE ENGINE

(71) Applicant: General Electric Company, Schenectady, NY (US)

(72) Inventors: Mohammed El Hacin Sennoun, West Chester, OH (US); Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 382 days.

(21) Appl. No.: 14/957,946

(22) Filed: Dec. 3, 2015

(65) Prior Publication Data

US 2017/0159566 A1 Jun. 8, 2017

(51) Int. Cl.
*F02C 7/18* (2006.01)
*F02C 3/04* (2006.01)
(Continued)

(52) U.S. Cl.
CPC .................. *F02C 7/18* (2013.01); *F01D 5/18* (2013.01); *F02C 3/04* (2013.01); *F02C 7/185* (2013.01);
(Continued)

(58) Field of Classification Search
CPC ...... F02C 7/12; F02C 7/14; F02C 7/18; F02C 7/185; F02C 3/04; F01D 5/18;
(Continued)

(56) References Cited

U.S. PATENT DOCUMENTS 3,546,882 A * 12/1970 Berkey ..................... F02C 7/18 415/79
5,722,241 A 3/1998 Huber
(Continued)

FOREIGN PATENT DOCUMENTS

EP 2 003 311 A2 12/2008
EP 3 075 957 A1 10/2016
(Continued)

OTHER PUBLICATIONS

Extended European Search Report and Opinion issued in connection with corresponding EP Application No. 16200103.6 dated Apr. 4, 2017.

*Primary Examiner* — Phutthiwat Wongwian
*Assistant Examiner* — Loren C Edwards
(74) *Attorney, Agent, or Firm* — McGarry Bair PC

(57) ABSTRACT

An apparatus and method of cooling a gas turbine engine including a core with a compressor section in which the compressor section includes a closed loop cooling circuit having a pump, at least one heat pipe extending from at least one of the stationary vanes, a heat exchanger located within the bypass air flow, and a coolant conduit passing fluidly coupled to the pump and heat exchanger and passing by the heat pipe. The pump pumps coolant through the coolant conduit to draw heat from the heat pipes into the coolant to form heated coolant, the heated coolant then passes through the heat exchanger, where the heat is rejected from the coolant to the bypass air to cool the coolant to form cooled coolant, which is then returned to the heat pipes.

28 Claims, 4 Drawing Sheets

(51) Int. Cl.
*F02K 3/06* (2006.01)
*F01D 5/18* (2006.01)
*F02K 3/115* (2006.01)

(52) U.S. Cl.
CPC ................ *F02K 3/06* (2013.01); *F02K 3/115* (2013.01); *F05D 2260/205* (2013.01); *F05D 2260/208* (2013.01); *F05D 2260/213* (2013.01); *Y02T 50/676* (2013.01)

(58) Field of Classification Search
CPC .......... F01D 5/185; F01D 5/186; F01D 5/187; F01D 25/12; F02K 3/06; F02K 3/115
USPC ........................................................... 60/806
See application file for complete search history.

(56) References Cited

U.S. PATENT DOCUMENTS

| | | | | | |
|---|---|---|---|---|---|
| 5,724,806 | A | 3/1998 | Horner | | |
| 7,600,382 | B2 * | 10/2009 | Ralls, Jr. | F02C 1/04 | 60/730 |
| 7,966,807 | B2 | 6/2011 | Norris et al. | | |
| 7,987,676 | B2 | 8/2011 | Ast et al. | | |
| 8,858,161 | B1 | 10/2014 | Ryznic et al. | | |
| 2005/0050877 | A1 * | 3/2005 | Venkataramani | F02C 7/047 | 60/39.093 |
| 2009/0133380 | A1 | 5/2009 | Donnerhack | | |
| 2010/0095648 | A1 * | 4/2010 | Zhang | F01K 23/10 | 60/39.182 |
| 2012/0216502 | A1 | 8/2012 | Freund et al. | | |
| 2014/0165570 | A1 | 6/2014 | Herring | | |
| 2015/0361891 | A1 * | 12/2015 | Schwarz | F02C 7/14 | 60/772 |

FOREIGN PATENT DOCUMENTS

| | | | |
|---|---|---|---|
| WO | 2002038938 | A1 | 5/2002 |
| WO | 2006079438 | A1 | 8/2006 |

* cited by examiner

CLOSED LOOP COOLING METHOD AND SYSTEM WITH HEAT PIPES FOR A GAS TURBINE ENGINE

BACKGROUND OF THE INVENTION

Turbine engines, and particularly gas or combustion turbine engines, are rotary engines that extract energy from a flow of gases passing through the engine in a series of compressor stages, which include pairs of rotating blades and stationary vanes, through a combustor, and then onto a multitude of turbine stages. In the compressor stages, the blades are supported by posts protruding from the rotor while the vanes are mounted to a stator casing. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine thrust, so cooling of certain engine components, such as a gearbox or vanes is necessary during operation. It is desirable to increase the thermal capacity of the compressor to perform desirable thermal management of the engine system.

BRIEF DESCRIPTION OF THE INVENTION

In one aspect, embodiments of the invention relate a method of cooling a gas turbine engine having a compressor with multiple, axially arranged stages of paired rotating blades and stationary vanes located between an outer compressor casing and inner compressor casing. The method includes a closed loop cooling of the compressor by drawing heat from at least one of the vanes with a heat pipe, drawing heat from the at least one heat pipe by routing a liquid coolant by the at least one heat pipe to form a heated liquid coolant, and routing the heated liquid coolant through a heat exchanger.

In another aspect, embodiments of the invention relate to a gas turbine engine including a core with a compressor section, combustor section, and turbine section in axial flow arranged and enclosed within a core casing. The compressor section has multiple, axially arranged stages of paired rotating blades and stationary vanes, a fan section in axial flow arrangement and upstream of the core with the fan section providing a bypass air flow around the core casing. The compressor section further includes a closed loop cooling circuit having a pump, at least one heat pipe extending from at least one of the stationary vanes, a heat exchanger located within the bypass air flow, and a coolant conduit passing through the pump, by the heat pipe, and through the heat exchanger. The pump pumps coolant through the coolant conduit to draw heat from the heat pipes into the coolant to form heated coolant, the heated coolant then passes through the heat exchanger, where the heat is rejected from the coolant to the bypass air to cool the coolant to form cooled coolant, which is then returned to the heat pipes.

DESCRIPTION OF EMBODIMENTS OF THE INVENTION

The described embodiments of the present invention are directed to systems, methods, and other devices related to routing air flow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

Figure 1:
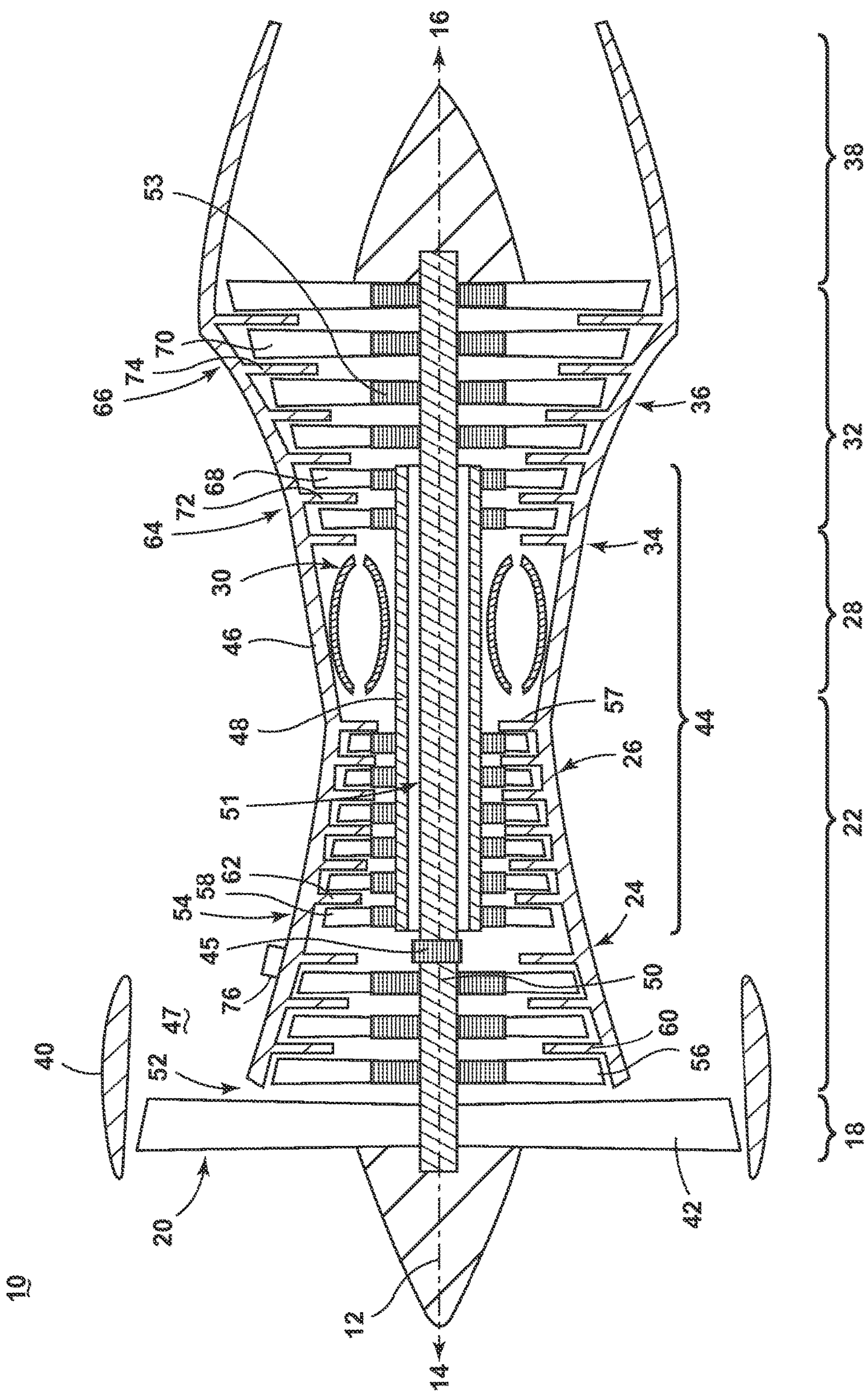
FIG. 1 is a schematic, sectional view of a gas turbine engine according to an embodiment of the invention.

FIG. 1 is a schematic cross-sectional diagram of a gas turbine engine, which can comprise a gas turbine engine 10, for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The compressor section 22, combustion section 28, and turbine section 32 are in axial flow arranged and enclosed within a core casing 46.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by the core casing 46, which can be coupled with the fan casing 40. At least a portion of the fan casing 40 encircles the core casing 46 to define an annular bypass channel 47.

A HP drive shaft or spool 48 disposed coaxially about the centerline 12 of the engine 10 drivingly connects the HP turbine 34 to the HP compressor 26. A LP drive shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle), each set comprising a pair, to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51. The compressor is not limited to an axial orientation and can be oriented axially, radially, or in a combined manner.

The LP compressor 24 and the HP compressor 26 can further include at least one guide vane which can be an inlet guide vane 55 positioned on the upstream end of the compressor section 22 and an outlet guide vane 57 positioned on the downstream end of the compressor section 22. The vanes are not limited to one type and can be for example non-variable stator vanes or stator vanes.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 as a bypass air flow and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28.

Hot portions of the engine also exist within the compressor section 22 and therefore the ambient air supplied by the fan 20 or cooler air from the compressor can be utilized, but not limited to, cooling portions of the compressor section 22. The bypass air flow can pass over a heat exchanger 76, which can be a surface cooler, located upstream of the compressor 26, within the bypass air flow of the bypass channel 47. Though illustrated within the bypass channel 47, the location of the heat exchanger 76 is not limited to the bypass channel and can be located at any suitable position within the engine 10 for example adjacent an inlet or outlet guide vane 55.

Figure 2:
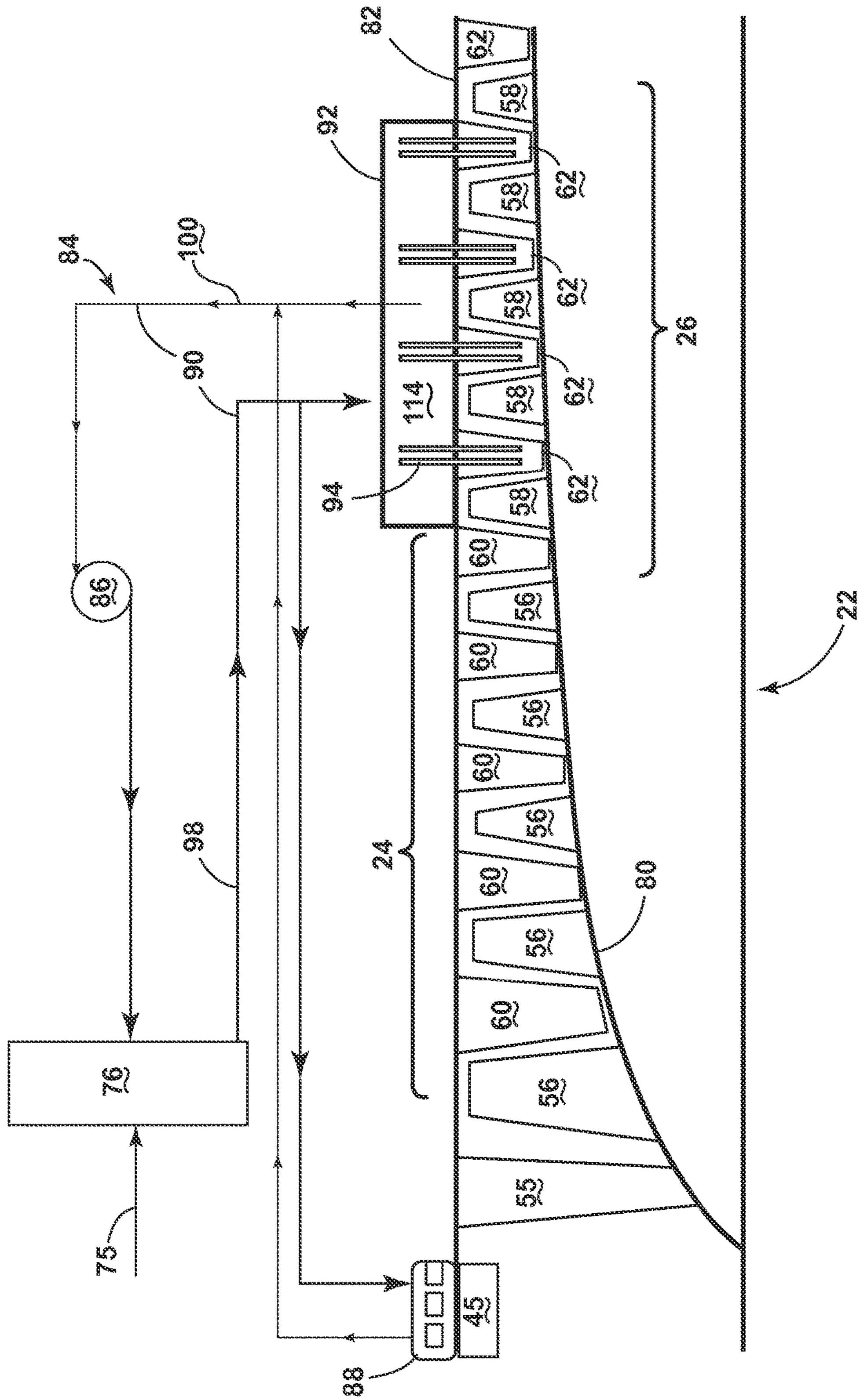
FIG. 2 is a schematic of a compression section of the gas turbine engine of FIG. 1 with intercooling of some of the compressor stages.

Referring to FIG. 2, a schematic of the compressor section 22 further illustrates an inner compressor casing 80 comprising, the rotor 51, and an outer compressor casing 82 disposed within the core casing 46. The multiple, axially arranged stages 52, 54 of paired rotating blades 58 and stationary vanes 62 are located between the outer compressor casing 82 and the inner compressor casing 80. A closed loop cooling circuit 84 having a pump 86, an intercooler 88, the heat exchanger 76, and a coolant conduit 90 is located proximate the compressor section 22. The coolant conduit 90 is fluidly coupled to the pump 86 and heat exchanger 76, and further comprises a manifold 92. The coolant conduit 90 is integral with at least one heat pipe 94 in that the at least one heat pipe 94 extends axially from within the vane 62 and is surrounded by the manifold 92. Multiple heat pipes 94 can be located within one vane 62 and multiple vanes 62 can include at least one heat pipe 94.

The closed loop cooling circuit 84 includes a connection via the coolant conduit 90 from the heat exchanger 76 to the intercooler 88 and back to the heat exchanger 76. The intercooler 88 and heat exchanger 76 can be any suitable type of heat exchanger, including, but not limited to surface coolers. Furthermore the intercooler 88 can comprise an inlet guide vane 55 and the heat exchanger 76 can comprise or be located adjacent to an outlet guide vane 57.

In one implementation, the engine 10 can further comprise a gearbox 45 that can be located at any suitable position within the engine 10 such that it connects the fan 20 of the fan section 18 to the spool 48, 50 of the core 44. The gearbox 45 allows the fan to run at a different speed than the engine. The closed loop cooling circuit 84 includes a connection via the coolant conduit 90 from the heat exchanger 76 to the intercooler 88 and back to the heat exchanger 76 wherein the intercooler 88 is provided on the gearbox 45. The intercooler 88 can be disposed on the gearbox 45 and the core casing 46.

An optional flow control device, for example, but not limited to, a control valve, can be included in the loop such that coolant flow to the intercooler 88 can be either on, off, or modulated depending on operating conditions.

The manifold 92 supplies a coolant volume 114 to an area surrounding the heat pipe 94 that allows a heat transfer medium (FIG. 3) within the heat pipe 94 to condense by transferring energy as heat from the heat pipe 94 to the coolant 114. The coolant conduit 90 creates a path for the liquid coolant 114 to flow in the closed loop cooling circuit 84 by utilizing the pump 86 to pump coolant 114 through the coolant conduit 90. The heat pipe 94 is a passive device with which to cool the at least one vane 62 connecting the at least one vane 62 and the manifold 92. The heat pipe 94 is any heat transfer device utilizing both thermal conductivity and phase transition to transfer heat from the at least one vane 62 through the heat pipe 94 to the liquid coolant 114 in the coolant conduit 90. It should be noted that the exact design of the manifold 92 can take many forms to accomplish this energy transfer. For example the coolant 114 can directly flow over the ends of the heat pipes 94 in a number of configurations.

Figure 3:
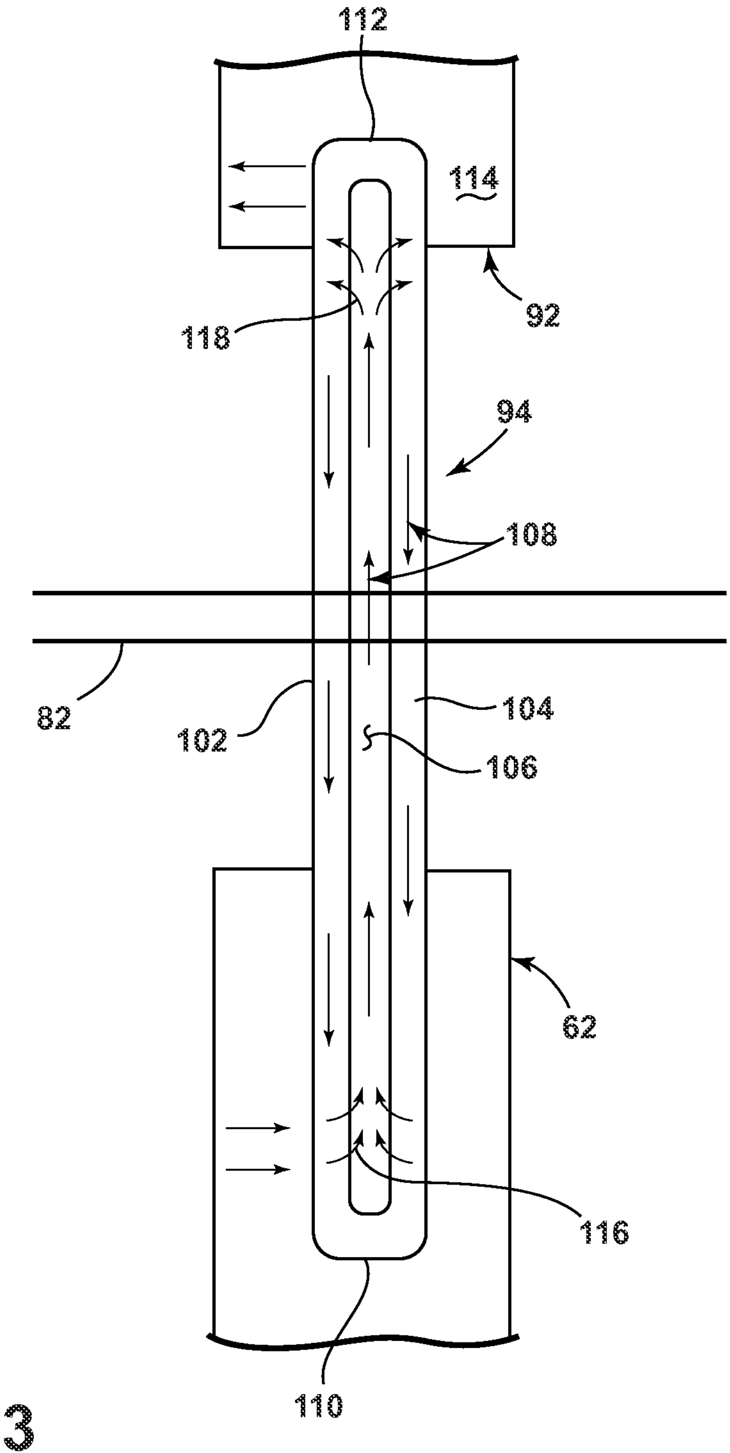
FIG. 3 is a schematic of a heat pipe.

FIG. 3 is an exemplary embodiment of the heat pipe 94 which includes a housing 102 defining an outer surface of the heat pipe. Disposed internally of the housing 102 is an absorbent wick 104 that surrounds a vapor cavity 106. A heat transfer medium 108, such as water or sodium or other suitable material, is disposed within the vapor cavity 68. A first end 110 of the heat pipe is disposed within the vane 62 and a second end 112 of the heat pipe 94 extends outwardly from the vane 62 into the manifold 92 so that the heat pipe operates with a thermal medium 114 to remove thermal energy from the second end 112 of the heat pipe 94. The heat transfer medium 108 is in a vapor state when at temperature ranges under which the vane 62 operates. When the heat transfer medium 108 evaporates to the vapor state 116, it absorbs heat from the vane 62 and moves to the portion of the heat pipe 94 within the manifold 92 where the heat transfer medium condenses back to liquid form 118 and releases heat which in turn heats the liquid coolant within the coolant conduit 90.

Figure 4:
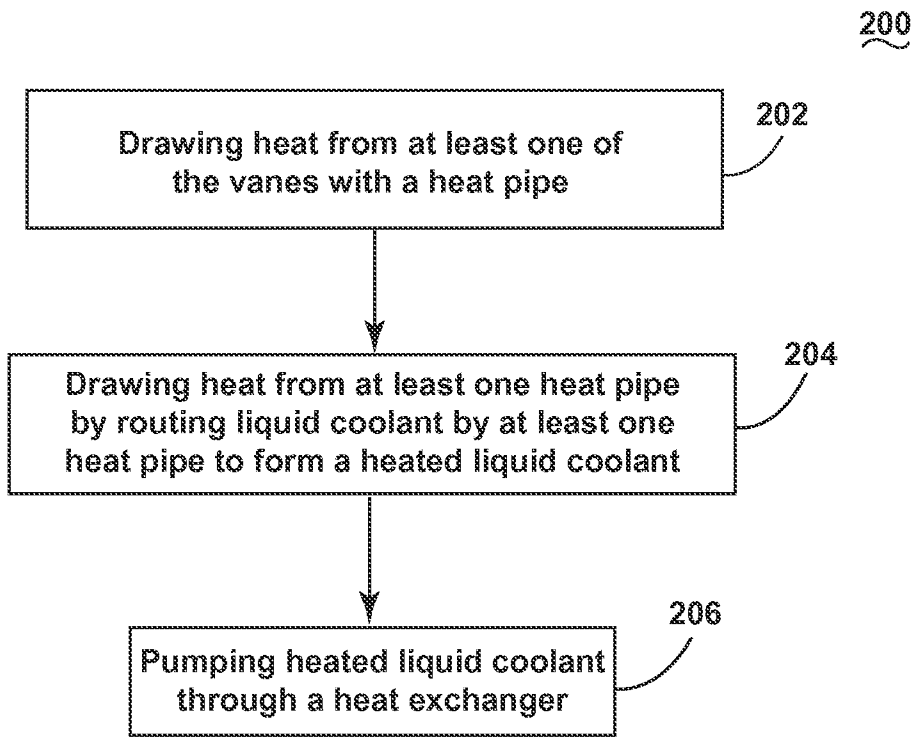
FIG. 4 is a flow chart depicting a method of cooling a gas turbine section.

Referring now also to FIG. 4 a flow chart illustrating a method 200 of cooling a gas turbine engine 10 by drawing heat 202 from at least one of the vanes 62 with a heat pipe 94, drawing heat 204 from the at least one heat pipe 94 by routing a liquid coolant by the at least one heat pipe 94 to form a heated liquid coolant and finally routing 206 heated liquid coolant through a heat exchanger. Fan air 75 is introduced as a cooling fluid to the heat exchanger 76 by way of the compressor section 22. This fan air 75 passes around the heat exchanger 76 to cool the liquid coolant to form cooled coolant 98 within the heat exchanger 76. The cooled coolant 98 is the liquid coolant in step 204 and can also be pumped to the intercooler 88 to cool the intercooler. The liquid coolant draws heat from the at least one heat pipe 94 and the intercooler 88 forming heated coolant 100. Then the heated coolant 100 flows from the manifold 92 to the pump 86, which can comprise a compressor, and then continues to the heat exchanger 76 where heat is further rejected from the coolant to the bypass air to cool the coolant to form the cooled coolant 98. The cooled coolant 98 is then returned to the manifold 92 and to the intercooler 88 and the process repeats. The cooled coolant 98 can be used to cool other parts via the intercooler 88 such as the gearbox 45.

Conventional means of moving liquid, gas, or a two-phase mixture can be used to pump the liquid coolant. The pump is a pressure rise device, for example a pump or a compressor. The pump or compressor can be driven using work from the engine for example a connecting gear on the shaft, or using electrical power generated from the engine.

It should be noted that an intercooler as described in the disclosure above is a mechanical device that can be any type of heat exchanger and should not be confused with the thermodynamic cycle of cooling a compressor stage or set of stages, i.e. intercooling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:

a core comprising a compressor section, combustor section, and turbine section in axial flow arranged and enclosed within a core casing, with the compressor section having multiple, axially arranged stages of paired rotating blades and stationary vanes;

a fan section in axial flow arrangement and upstream of the core, the fan section providing a bypass air flow around the core casing; and a closed loop cooling circuit having a pump, at least one heat pipe containing a heat transfer medium capable of phase transition and extending radially between a first end located within at least one of the stationary vanes and terminating in a second end located within a manifold defining an area surrounding the at least one heat pipe, a heat exchanger located within the bypass air flow, and a coolant conduit fluidly separate from the at least one heat pipe and fluidly coupled to the pump, to the heat exchanger, and to the manifold;

wherein the pump pumps coolant through the coolant conduit to the manifold to draw heat from the heat transfer medium within the at least one heat pipe into the coolant to form heated coolant, the heated coolant then passes through the heat exchanger, where the heat is rejected from the heated coolant to the bypass air to cool the heated coolant to form cooled coolant, which is then returned to the manifold.

2. The gas turbine engine of claim 1 wherein the stationary vanes are variable stationary vanes.

3. The gas turbine engine of claim 1 wherein the closed loop cooling circuit further comprises an intercooler.

4. The gas turbine engine of claim 3 wherein the intercooler is located on the core casing.

5. The gas turbine engine of claim 4 wherein the intercooler is a surface cooler.

6. The gas turbine engine of claim 3 wherein the intercooler comprises inlet guide vanes to the compressor section.

7. The gas turbine engine of claim 3 further comprising a gearbox connecting a fan of the fan section to a drive shaft of the core, and the intercooler cools the gearbox.

8. The gas turbine engine of claim 7 wherein the intercooler is a surface cooler provided on the gearbox.

9. The gas turbine engine of claim 3 wherein the at least one heat pipe comprises multiple heat pipes.

10. The gas turbine engine of claim 9 wherein the at least one stationary vane comprises multiple stationary vanes with multiple heat pipes.

11. The gas turbine engine of claim 1 wherein at least a portion of the fan section encircles the core casing to define an annular bypass channel and the heat exchanger is located within the bypass channel.

12. The gas turbine engine of claim 1 wherein closed loop cooling circuit further comprising a compressor.

13. The gas turbine engine of claim 12 wherein the coolant comprises a two-phase mixture.

14. The gas turbine engine of claim 1 wherein the heat exchanger comprises a surface cooler.

15. The gas turbine engine of claim 14 wherein the compressor comprises outlet guide vanes and the heat exchanger is located adjacent the outlet guide vanes.

16. A gas turbine engine comprising:

a core comprising a compressor section, combustor section, and turbine section in axial flow arranged and enclosed within a core casing, with the compressor section having multiple, axially arranged stages of paired rotating blades and stationary vanes;

a fan section in axial flow arrangement and upstream of the core, the fan section providing a bypass air flow around the core casing; and a closed loop cooling circuit having a pump, at least one heat pipe having a housing containing a heat transfer medium and extending radially between a first end located within at least one of the stationary vanes and terminating in a second end located within a manifold defining an area surrounding the at least one heat pipe, a heat exchanger located within the bypass air flow, and a coolant conduit fluidly separate from the at least one heat pipe and fluidly coupled to the pump, to the heat exchanger, and to the manifold;

wherein the pump pumps liquid coolant through the coolant conduit to the manifold to draw heat from the heat transfer medium within the at least one heat pipe into the liquid coolant to form heated coolant, the heated coolant then passes through the heat exchanger, where the heat is rejected from the heated coolant to the bypass air to cool the heated coolant to form cooled coolant, which is then returned to the manifold.

17. The gas turbine engine of claim 16 wherein the housing further comprises a vapor cavity in which the heat transfer medium is contained.

18. The gas turbine engine of claim 17 wherein the housing is an absorbent wick.

19. A method of cooling the gas turbine engine of claim 16, the method comprising: a closed loop cooling of the compressor section by drawing heat from at least one of the vanes with the heat pipe, drawing heat from the at least one heat pipe by routing the liquid coolant by the at least one heat pipe to form the heated coolant, and routing the heated coolant through the heat exchanger.

20. The method of claim 19 wherein drawing the heat from at least one vane comprises drawing the heat from the at least one vane with multiple heat pipes.

21. The method of claim 20 wherein drawing the heat from at least one vane comprises drawing the heat from multiple vanes with multiple heat pipes.

22. The method of claim 19, wherein the routing the liquid coolant by the at least one heat pipe comprises routing the liquid coolant through the manifold surrounding the at least one heat pipe.

23. The method of claim 19 wherein the drawing the heat from the at least one vane comprises drawing the heat from a variable stator vane.

24. The method of claim 19 further comprising routing the liquid coolant through an intercooler located within the gas turbine engine.

25. The method of claim 24 wherein the routing the liquid coolant through the intercooler comprises routing the liquid coolant through a surface cooler located upstream of the compressor.

26. The method of claim 24 wherein the routing the liquid coolant through the intercooler comprises routing the liquid coolant through at least one of inlet guide vanes and outlet guide vanes of the compressor.

27. The method of claim 19 further comprising passing a cooling fluid through the heat exchanger.

28. The method of claim 27 wherein the cooling fluid comprises the bypass air flow from the fan section of the gas turbine engine.

* * * * *